United States Patent
Bumgarner et al.

(10) Patent No.: US 7,376,658 B1
(45) Date of Patent: May 20, 2008

(54) MANAGING CROSS-STORE RELATIONSHIPS TO DATA OBJECTS

(75) Inventors: Bill Bumgarner, San Jose, CA (US); Christopher M. Hanson, Cupertino, CA (US); Ronald Dennis Lue-Sang, Mountain View, CA (US); Stephen E. Miner, Calabash, NC (US); Benjamin Trumbull, San Jose, CA (US); Melissa Turner, San Jose, CA (US); Andreas Wendker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 11/104,187

(22) Filed: Apr. 11, 2005

(51) Int. Cl.
*G06F 17/00* (2006.01)
(52) U.S. Cl. .................................................. 707/100
(58) Field of Classification Search ................. 707/100
See application file for complete search history.

(56) References Cited

U.S. PATENT DOCUMENTS

| | | | |
|---|---|---|---|
| 5,577,252 A | 11/1996 | Nelson et al. | |
| 5,873,093 A | 2/1999 | Williamson et al. | |
| 5,898,871 A | 4/1999 | Williamson et al. | |
| 5,956,728 A | 9/1999 | Federighi et al. | |
| 6,085,197 A | 7/2000 | Federighi et al. | |
| 6,606,668 B1 * | 8/2003 | MeLampy et al. | 709/241 |
| 7,000,187 B2 | 2/2006 | Messinger et al. | |
| 7,254,750 B1 * | 8/2007 | Okun et al. | 714/47 |
| 2004/0209230 A1 | 10/2004 | Beu et al. | |

* cited by examiner

*Primary Examiner*—Chong H Kim
(74) *Attorney, Agent, or Firm*—Van Pelt, Yi & James LLP

(57) ABSTRACT

Managing cross-store relationships to data objects is disclosed. Specifically, cross-store relationships to data objects stored in a potentially dynamically changing set of persistent data stores is provided through a relationship definition that identifies a type of object to which the relationship pertains and specifies a property to be used to determine, which, if any, objects of the identified type are to be included in the relationship; by determining dynamically which, if any, currently available objects of the identified type have the specified property; and making available from among the objects of the identified type available at that time, if any, those objects, if any, that have the specified property.

29 Claims, 13 Drawing Sheets

MANAGING CROSS-STORE RELATIONSHIPS TO DATA OBJECTS

CROSS REFERENCE TO OTHER APPLICATIONS

U.S. patent application Ser. No. 11/104,221, entitled DYNAMIC MANAGEMENT OF MULTIPLE PERSISTENT DATA STORES, filed concurrently herewith, is incorporated herein by reference for all purposes.

U.S. Pat. No. 5,873,093 entitled METHOD AND APPARATUS FOR MAPPING OBJECTS TO A DATA SOURCE filed May 28, 1997, is incorporated herein by reference for all purposes; U.S. Pat. No. 5,898,871 entitled DYNAMIC OBJECT COMMUNICATION PROTOCOL filed May 27, 1997, is incorporated herein by reference for all purposes; U.S. Pat. No. 5,956,728 entitled OBJECT GRAPH EDITING CONTEXT AND METHODS OF USE filed Jul. 17, 1996, is incorporated herein by reference for all purposes; and U.S. Pat. No. 6,085,197 entitled OBJECT GRAPH EDITING CONTEXT AND METHODS OF USE filed Oct. 6, 1998, is incorporated herein by reference for all purposes.

BACKGROUND OF THE INVENTION

Traditional implementations of object-storage mapping frameworks focus on enterprise client/server databases and only allow for a fixed configuration of databases or persistent data stores. In addition, in a typical prior art system, relationships between data objects are defined rigidly, e.g., using identifiers such as primary keys, pointers, etc. Relationships that are implemented using such identifiers between objects are very explicit. Thus, if for example, a pointer exists from a first type of object to second type of object and even one instance of an object of the second type becomes unexpectedly unavailable, such that the relationship is no longer valid for the corresponding instance of an object of the first type, the relationship fails for all associated objects of the affected types, resulting in a broader failure of one or more client contexts or other applications or processes that had been using the affected objects.

In some modern environments, the set of available data objects may change dynamically during runtime, e.g., as data sources (removable media, mobile systems and devices, etc.) are added or removed from access via a network. As such, there is a need for a way to define and manage more flexibly relationships to target data objects, including across multiple and potentially dynamically changing persistent data stores, so that processes associated with such relationships do not fail as the universe of available data objects changes at runtime.

BRIEF DESCRIPTION OF THE DRAWINGS

Various embodiments of the invention are disclosed in the following detailed description and the accompanying drawings.

DETAILED DESCRIPTION

Figure 1:
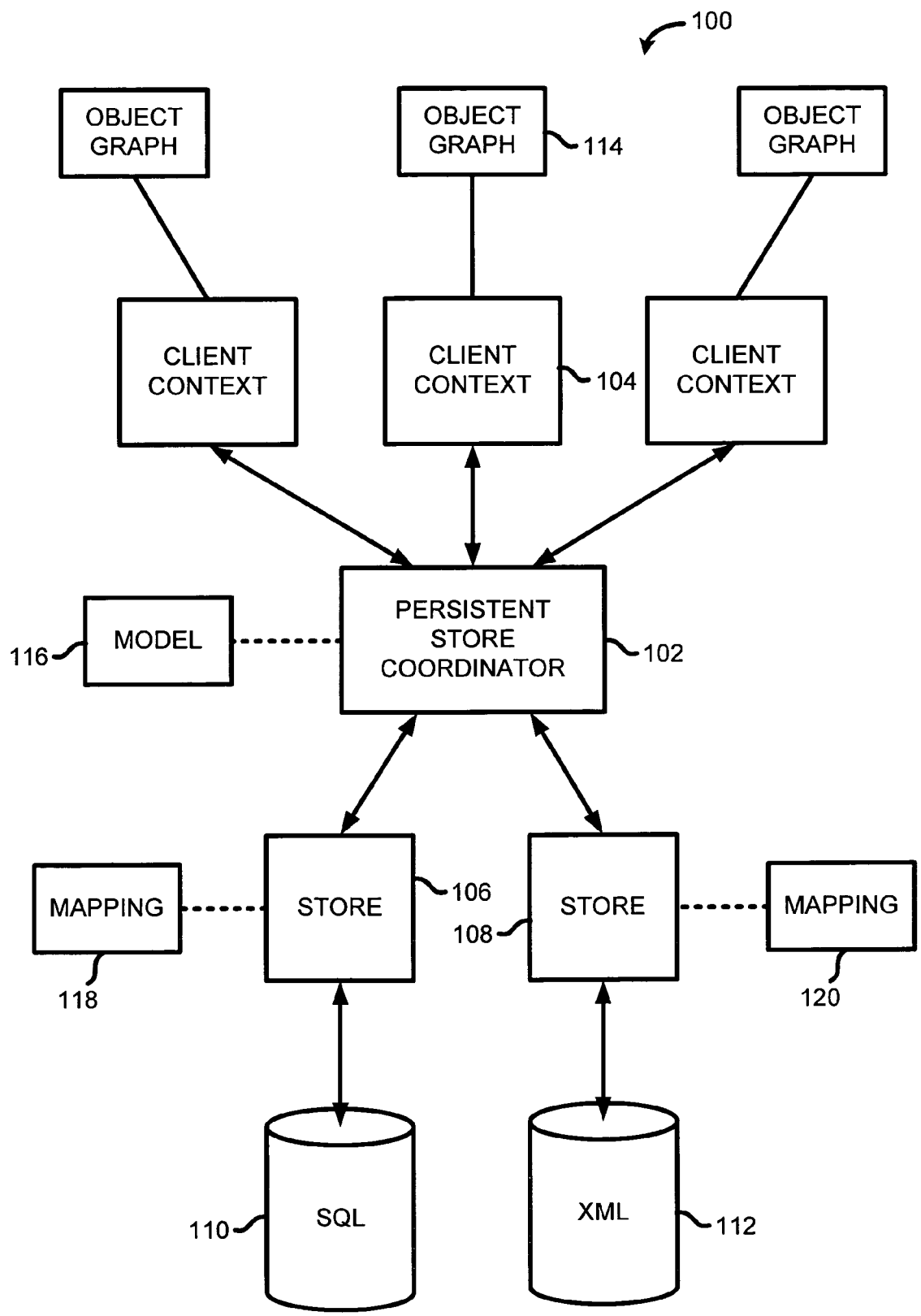
FIG. 1 illustrates an embodiment of a persistent store coordinator configured to manage dynamically multiple persistent data stores.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing cross-store relationships to data objects is disclosed. Specifically, cross-store relationships to data objects stored in a potentially dynamically changing set of persistent data stores is provided through a relationship definition that identifies a type of object to which the relationship pertains and specifies a property to be used to determine, which, if any, objects of the identified type are to be included in the relationship; by determining dynamically which, if any, currently available objects of the identified type have the specified property; and making available from among the objects of the identified type available at that time, if any, those objects, if any, that have the specified property. In some embodiments, objects are identified by unique store and object identifiers which may be represented in a standard form, such as by a uniform resource indicator (URI).

In some embodiments, a persistent store coordinator is employed to manage a plurality of persistent data stores. The persistent store coordinator allows the dynamic addition or removal of the persistent data stores and grows or shrinks the visible data sets of one or more client contexts accordingly. Communication between client contexts and the persistent data stores is facilitated by the coordinator in a manner in which the data associated with the individual persistent data stores appear to be associated with a single data source to the client contexts. Thus, the persistent store coordinator provides to the client contexts a unified façade of all the data stored in the available persistent data stores.

FIG. 1 illustrates an embodiment of a persistent store coordinator configured to manage dynamically multiple persistent data stores. In the example shown in environment 100, persistent store coordinator 102 uses store objects 106 and 108 which represent a pair of persistent data stores, structured query language (SQL) database 110 and extensible markup language (XML) file 112, respectively, to make objects stored in database 110 and file 112 available to a plurality of client contexts, such as client context 104. Each of the client contexts manages an object graph that represents the objects in memory that are in use by that client context and the relationships between related objects. As depicted in FIG. 1, client context 104 tracks the objects it is using and has stored in memory via object graph 114.

The object graphs of the client contexts are each formally described by one or more models (i.e. one or more forms of data files). Persistent store coordinator 102 realizes a single model 116 based on the summation of model(s) associated with the object graphs of the client contexts. Model 116 serves as a shared means for communication between the client contexts, such as client context 104, and persistent store coordinator 102. The specific model associated with a particular object in memory (which is part of model 116) enables persistent store coordinator 102 to infer the manner in which that particular object in memory maps into the structure of an associated persistent data store. The mapping associated with each type of object in memory can be inferred programmatically by model 116 and/or, in some embodiments, configured manually, e.g., by a developer of an application associated with client context 104. For the same object in memory, different mappings may exist for different types of persistent data stores. Based on the associated mapping, an object may be mapped into one or more tables in a database or similarly into other storage formats associated with other kinds of persistent data stores. Likewise, individual attributes of an object may be mapped to one or more fields in a database or similarly to other storage formats associated with other kinds of persistent data stores, and the type of an attribute may be switched (e.g., a number might be stored as a string or vice versa). That is, the mapping provides the translations for attributes, types, and locations of the data elements that comprise an object. Upon realization of model 116, persistent store coordinator 102 associates with each type of store object its corresponding mapping. As depicted in FIG. 1, mapping 118 is associated with store object 106, and mapping 120 is associated with store object 108. In some embodiments, when a store is added, as described more fully below, a client context that wants to access data objects associated with the new store provides to persistent store coordinator 102 a "configuration" data or other information that identifies to the persistent store coordinator 102 the object(s) within the model 116 in connection with which the client context expects to use the new store. The persistent store coordinator 102 uses this configuration information and metadata and/or other data associated with the new store to infer a mapping between the objects identified in the configuration data and the corresponding elements in the new store. For example, if a client context were to indicate it desired to use a new store in connection with its "person" and "phone" objects, the persistent store coordinator 102 might infer in one embodiment that a data element referred to as "name" in the new store maps to "person" and a "primary phone" element maps to "phone".

In the example shown, each store object, such as store objects 106 and 108, represents an external persistent data store, e.g., an SQL database, XML file, relational database management system (RDBMS), binary file, etc. A persistent data store may be located on a hard drive, on a removable storage media, on a server or workstation in a network, etc. Each store object handles access to one type of file, e.g., store object 106 represents SQL database 110 and store object 108 represents XML file 112. In some embodiments, a persistent store coordinator (PSC) such as PSC 102 may be associated with one or more client contexts and one or more store objects, each store object being associated with a single persistent data store. In some embodiments, more than one PSC may access the same persistent data store, but each uses its own associated store object to do so. In some embodiments, a store object encapsulates a concrete file format access mechanism and has an application program interface (API) that enables communication with its associated persistent data store. The mapping associated with each store identifies the manner in which object-storage mapping is implemented, i.e., the manner in which objects in memory are mapped into external data stored in persistent data stores and, likewise, the manner in which external data in persistent data stores are mapped into objects in memory. One manner in which objects are mapped to a data source is described in U.S. Pat. No. 5,873,093 entitled METHOD AND APPARATUS FOR MAPPING OBJECTS TO A DATA SOURCE issued Feb. 16, 1999, which was incorporated herein by reference above.

The client contexts, such as client context 104, may each correspond to an individual window of an application. However, the individual client contexts may be configured in a variety of ways. That is, a persistent store coordinator such as persistent store coordinator 102 can have an arbitrary number of possibly dissimilar clients. In some embodiments, multiple client contexts may communicate with the same persistent store coordinator, but each client context exclusively communicates with a single persistent store coordinator. Client contexts may be nested in their own hierarchy with parent client contexts serving to delimitate the scope of changes sub-contexts (or child client contexts) make. Each store object is managed by a single persistent store coordinator. A particular application or process may have multiple persistent store coordinators.

Figure 2:
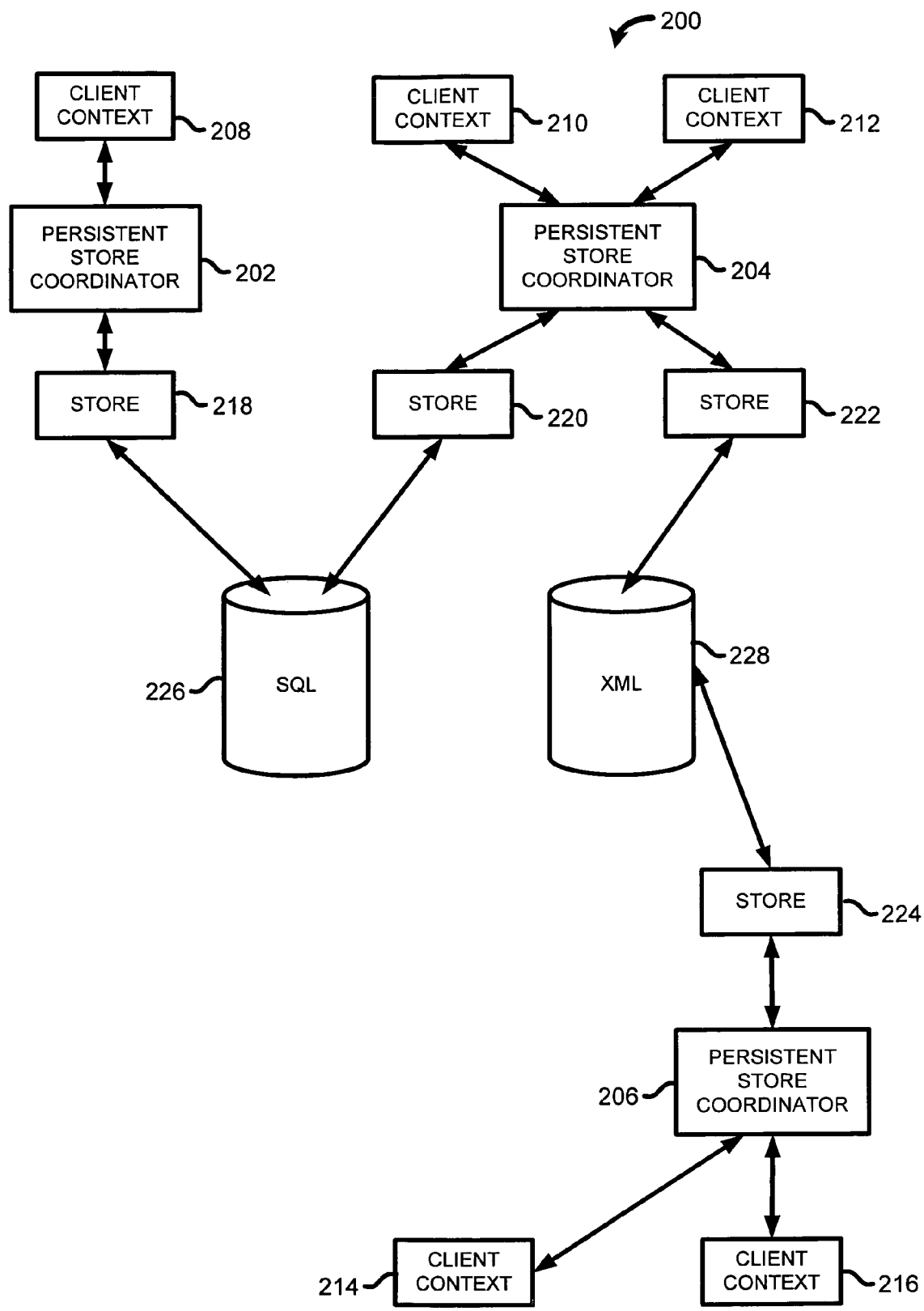
FIG. 2 illustrates an embodiment of an environment in which the store objects associated with different persistent store coordinators share the same persistent data sources.

FIG. 2 illustrates an embodiment of an environment in which the store objects associated with different persistent store coordinators share the same persistent data sources. Specifically, environment 200 includes three distinct persistent store coordinators, 202, 204, and 206, which are independent of one another. In some embodiments, each persistent store coordinator is part of a "stack" which includes the persistent store coordinator and associated client context(s) and store object(s). An application or process may be characterized by multiple stacks depending upon the requirements of the client contexts. In the example shown in FIG. 2, three stacks corresponding to the three persistent store coordinators are depicted. The object graphs, models, and mappings associated with the client contexts, persistent store coordinators, and store objects, respectively, as depicted in FIG. 1, have been omitted from FIG. 2 for conciseness.

As depicted in FIG. 2, each of the client contexts 208-216 is distinct (i.e. each client is associated with a single persistent store coordinator), and the client contexts may be associated with the same application or different applications. Similarly, each distinct store object 218-224 is managed by a single persistent store coordinator. However, multiple store objects, each of which is associated with a different persistent store coordinator, may represent the same external persistent data store and even the same data file. For instance, as depicted in FIG. 2, store objects 218 and 220 both represent SQL database 226 and store objects 222 and 224 both represent XML file 228. Thus, by employing multiple stacks, concurrent requests to each persistent data store are possible. In an embodiment in which multiple PSC's access the same persistent data store, the PSC's may be configured to mediate conflicts between them automatically. Likewise, if a PSC accesses the same persistent data store for two or more client contexts, the PSC may be configured to resolve conflicts on behalf of the client contexts or defer conflict resolution to the client contexts. In some embodiments, mechanisms are provided for developers of the client contexts to handle conflicts in the most appropriate manner to fit the needs of their application. In some embodiments, conflicts resulting from multiple changes to data may be resolved by selecting one set of changes and discarding the rest (e.g., the first change or last change may be selected). In some embodiments, multiple changes are merged.

Figure 3:
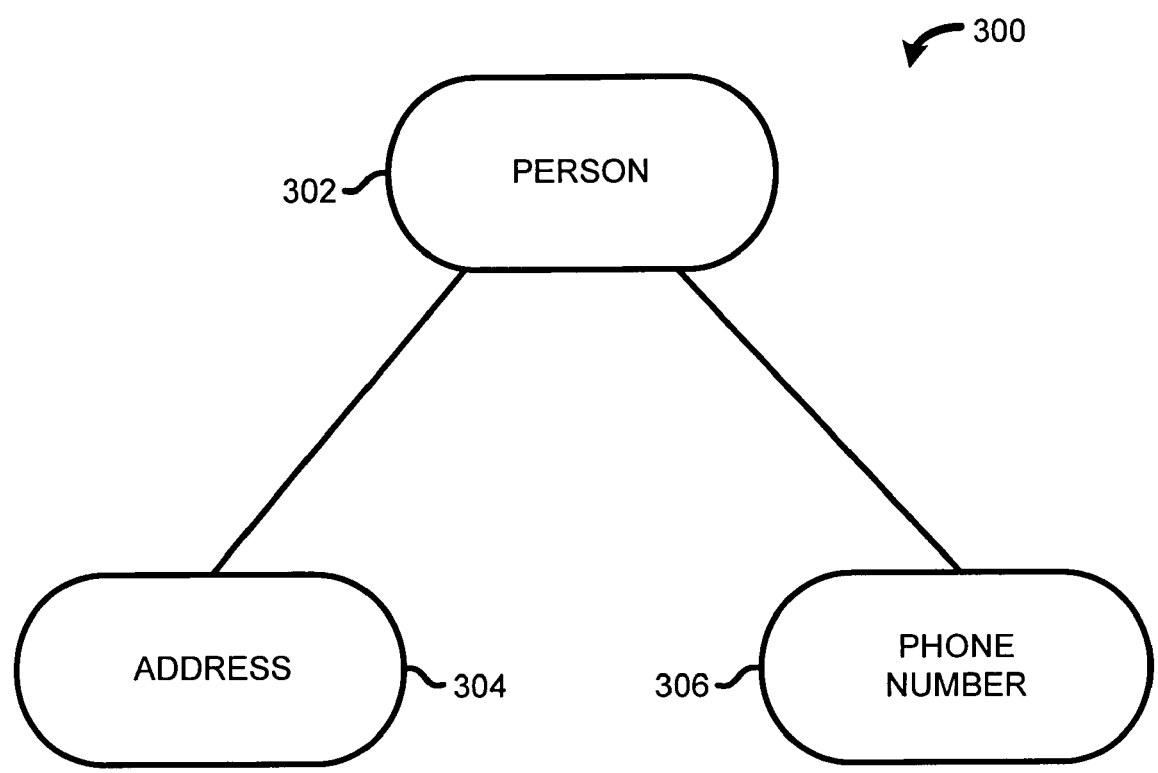
FIG. 3 illustrates an embodiment of an object graph associated with a client context.

FIG. 3 illustrates an embodiment of an object graph associated with a client context. In some embodiments, object graph 300 corresponds to object graph 114 of FIG. 1. Each client context manages an object graph, such as object graph 300, that represents the objects in memory that are in use by that client context. An object graph also provides the relationships between related objects. In some embodiments, a programming interface, such as a "container", is used by the client context to refer to the objects and the corresponding object graph associated with the client. In such embodiments, the objects of the client context are created in, run from, and managed by the container. In FIG. 3, object graph 300 includes three objects: a person object 302, an address object 304, and a phone number object 306. Object graph 300 also depicts the relationships between these three objects. Specifically, each person object 302 has an associated address object 304 and an associated phone number object 306. An object graph, such as object graph 300, is used by a client context to keep track of the objects it is using and has stored in memory and the relationships between related objects. As described above, in some embodiments a formal description of the object graph of a client context is provided to an associated persistent store coordinator via one or more models that describe the objects that comprise the object graph.

Figure 4:
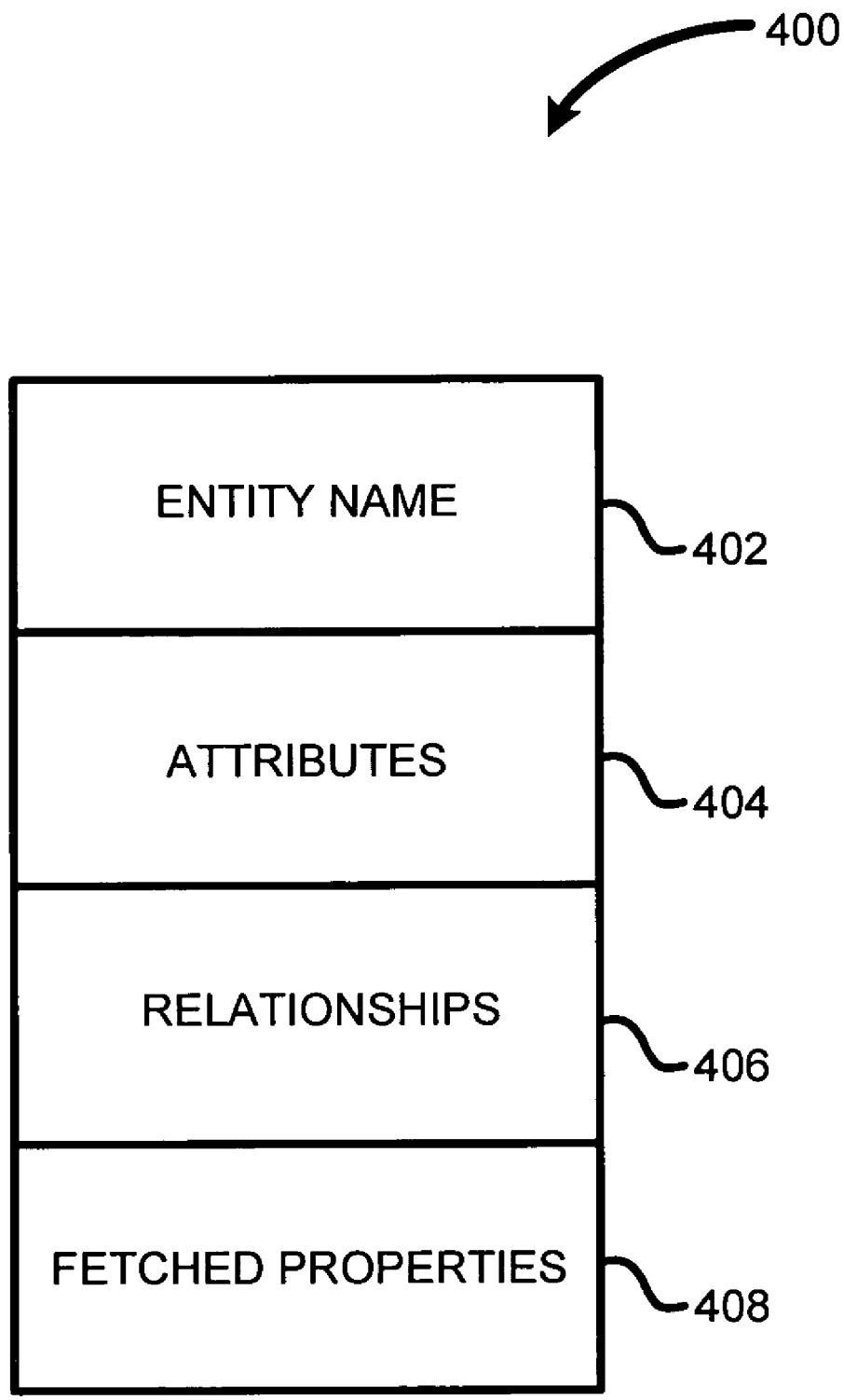
FIG. 4 illustrates an embodiment of the components of a model that is used to formally describe a particular object (or object graph) in memory.

FIG. 4 illustrates an embodiment of the components of a model that is used to formally describe a particular object (or object graph) in memory. As depicted in FIG. 4, a model includes for each type of object in an object graph associated with a client context with which a PSC is associated an entity 400. Each entity includes in the example shown an entity name 402, attribute(s) 404, relationship(s) 406, and "fetched properties" 408. An entity maps to an object class and describes a particular type of object. For example, a person entity exists for a person object, an address entity exists for an address object, etc. In some embodiments, a model exists for each type of object (i.e. entity) in memory. In some embodiments, a model includes more than one entity. An entity 400 includes one or more attributes 404 that describe the entity 400. For example, a "person" entity may include a "name" attribute.

One or more relationships 406 associated with an entity 400 describe links between related entities of a model. For example, a "person" entity may include a relationship indicating that each person object has associated with it an address object. The relationship may indicate a "target" or "destination" entity associated with the other end of the relationship (e.g., a relationship reflecting that each "person" object has an associated "address" object may point in the model to an "address" entity); a way in which the particular target object related to a particular instance of an object associated with the entity may be identified, such as a pointer, primary key, or other data to be used to identify the target data; and/or other information associated with the relationship. A relationship in the traditional sense is inflexible in the sense that the destination or target of a relationship, which is associated with the identifier associated with a specific target object, is static or fixed. In addition, if a target object is for any reason not available (e.g., the data store in which the target object is stored becomes unexpectedly unavailable), the relationship breaks which, in turn, causes the object defining the relationship, and in many cases all instances of objects of the same type as the object defining the relationship, to break until the relationship can be re-established, e.g., when the target object of the relationship becomes available again.

Figure 5:
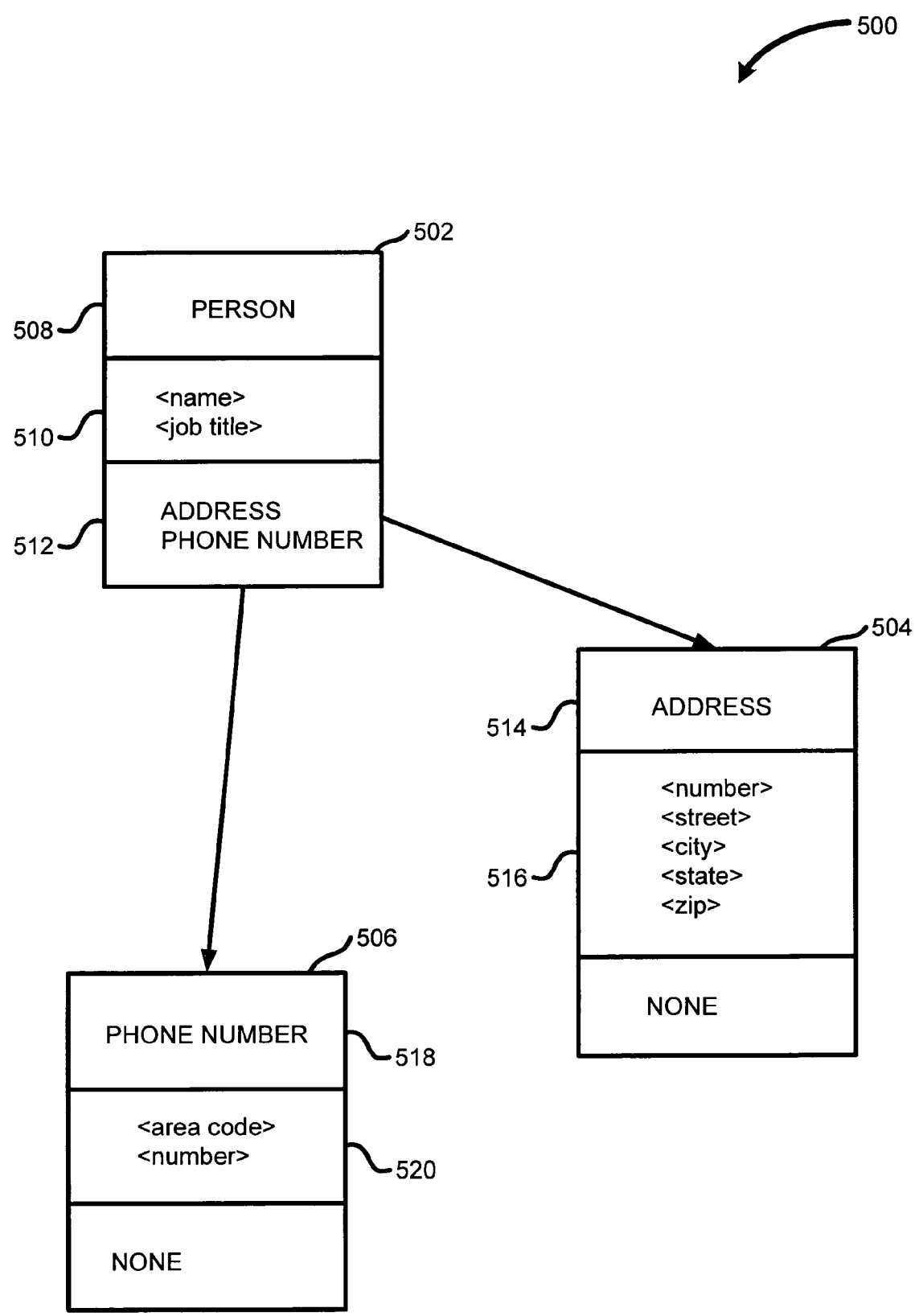
FIG. 5 illustrates an embodiment of a model that formally describes the object graph depicted in FIG. 3.

FIG. 5 illustrates an embodiment of a model that formally describes the object graph depicted in FIG. 3. Object graph 300 of FIG. 3 includes three types of objects—a person object 302, an address object 304, and a phone number object 306—and depicts two relationships: between person object 302 and address object 304 and between person object 302 and phone number object 306. In some embodiments, each type of object is represented in a model by an associated entity. In model 500, a person entity 502 represents objects of the type (or class, e.g.) "person", an address entity 504 represents objects of the type "address", and a phone number entity 506 represents objects of the type "phone number". Person entity 502 includes an entity name 508 and attributes 510: <name> and <job title>. Person entity 502 also describes relationships 512 to address entity 504 and phone number entity 506. In some embodiments, the relationships 512 may include a description of how the target data object related to a particular instance of a person object is found, e.g., the key, identifier, or other data used to access the target data in a data store associated with the target object. No fetched properties (i.e. 408 of FIG. 4) are associated with person entity 502 in the example shown. Address entity 504 includes an entity name 514 and attributes 516: <number>, <street>, <city>, <state>, and <zip>. No relationships or fetched properties (i.e. 406 and 408, respectively, of FIG. 4) are associated with address entity 504. Phone number entity 506 includes an entity name 518 and attributes 520: <area code> and <number>. No relationships or fetched properties (i.e. 406 and 408, respectively, of FIG. 4) are associated with phone number entity 506.

The entire object graph 300 of FIG. 3 is formally described by model 500, which includes the person entity 502, address entity 504, and phone number entity 506. One or more models, such as model 500, representing one or more object graphs associated with one or more client contexts are employed by a persistent store coordinator, such as persistent store coordinator 102 of FIG. 1, to realize a single, composite model, such as model 116 of FIG. 1, that enables the persistent store coordinator and associated client contexts to communicate.

In some embodiments, an object and its associated data file stored in a persistent data store may include only a subset of a model. A subset of a model, referred to herein sometimes as a "configuration", defines a subset of one or more entities of the model that is/are associated with an external data file or other persistent data store. For example, model 500 of FIG. 5 includes the person, address, and phone number entities and a particular configuration, e.g., including the person and address entities, may be associated with a particular persistent data store, such as might occur if names and addresses were stored together in one persistent store but phone numbers were stored in another, separate store.

In some embodiments, an entity (i.e., 400 of FIG. 4) includes one or more "fetched properties" (i.e. 408 of FIG. 4). Fetched properties that are associated with an entity describe loosely coupled relationships between related entities of a model. Fetched properties differ from formal relationships (i.e. 406 of FIG. 4) in that the target or destination object(s) associated with the other end of a fetched property are described in some embodiments by a query. The target objects of a type associated with the fetched property that satisfy one or more criteria associated with the fetched property are included in the relationship. In some embodiments, the set of target objects included in the relationship defined by the fetched property may change dynamically, at runtime, as the universe of objects of the type with which the fetched property is associated changes as objects and/or data stores are added or removed. The results of the query (i.e. "fetch") defined by a fetched property are very dynamic and include all instances of the target entity that at any given time satisfy the criteria associated with the fetched property. The target entity of a fetched property is not associated with an identifier or pointer to a particular instance of the target entity, as is the case for a formal relationship. Rather, all instances of the target entity that satisfy the criteria of a fetched property are returned in response to the query associated with the fetched property and depend on the available data stores. As in a relationship, the criteria of a fetched property may include an identifier or key associated with an object that is a particular instance of the target entity. However, since a fetched property is not a formal relationship, if the particular object specified by the identifier is not available (e.g., the store in which the object is stored is unavailable), the object that defines the fetched property does not fail as it would in a relationship and may receive other instances of the target entity that satisfy the other criteria, if any, associated with the fetched property.

In some embodiments, a persistent store coordinator executes the query or fetch operation associated with a fetched property of a particular object of a client context. In some embodiments, a store object associated with a PSC realizes the conditional or loose relationship defined by the fetched property. In some embodiments, a query is expressed using a native query language associated with a persistent data store. In some embodiments, if one or more source store(s) is/are associated with a fetched property, the query is performed only within the specified source store(s). If no source store is specified, the persistent store coordinator executes the query across all stores that support the target entity of the fetched property. The entities supported by a store may be determined by the configuration associated with that store. Aggregating like data (i.e. data that corresponds to a particular entity) retrieved, where applicable, from multiple stores, sometimes referred to as "striping", allows the retrieval in a single operation of all the objects associated with an entity from all available and applicable persistent data stores. Striping is further described in copending U.S. patent application Ser. No. 11/104,221 entitled DYNAMIC MANAGEMENT OF MULTIPLE PERSISTENT DATA STORES filed concurrently herewith, which was incorporated herein by reference above.

In some embodiments, if a specific object is specified in the criteria associated with a fetched property and the store in which the object is stored is not available, the persistent store coordinator returns a notification to the client context that the desired object is currently unavailable and still returns other instances of the target entity that satisfy the other criteria of the fetched property, if any. Thus, fetched properties incorporate the formality of relationships by allowing the specification of particular instances of target entities yet allow the flexibility of a dynamic environment in which data stores may be added or removed without causing the informal relationships defined by the fetched properties between various objects or their associated entities to fail with respect to those target objects that remain available and/or with respect to objects of the same type as the object for which the fetched property is defined.

Figure 6:
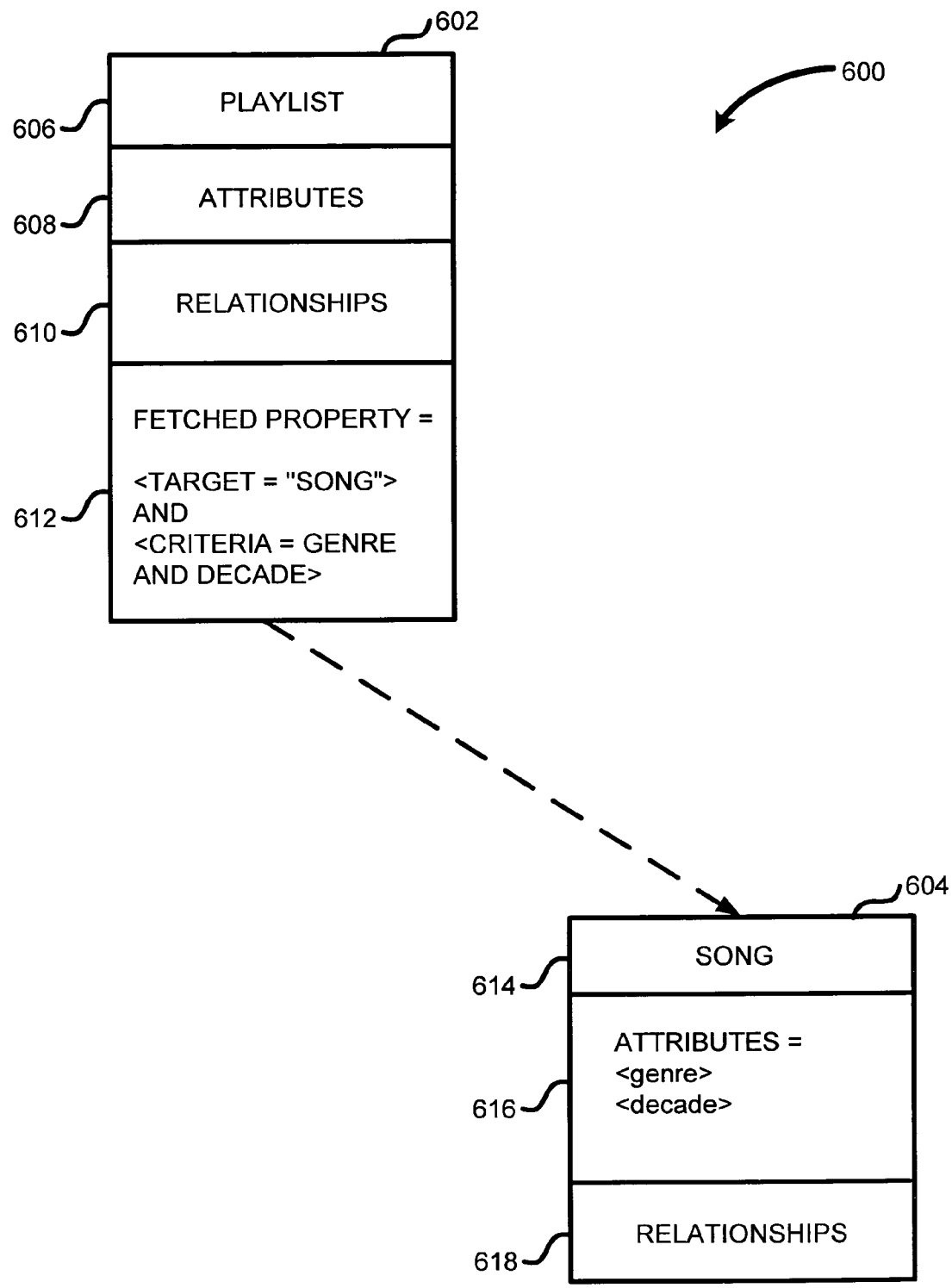
FIG. 6 illustrates an embodiment of a model in which an entity includes a fetched property.

FIG. 6 illustrates an embodiment of a model in which an entity includes a fetched property. In model 600, a playlist entity 602 represents objects of a type (or class, e.g.) named "playlist", and a song entity represents objects of type "song". Playlist entity 602 includes an entity name 606 and may or may not include one or more attributes 608 and/or relationships 610. In the given example, playlist entity 602 includes a fetched property 612 whose destination or target entity is song entity 604. The criteria of the query associated with fetched property 612 includes the <genre> and <decade> attributes of the target song entity 604. In some embodiments, one or more predicates and/or predicate expressions may be used to express the criteria associated with a fetched property such as fetched property 612. As depicted in FIG. 6, song entity 604 includes an entity name 614 and attributes 616: <genre> and <decade>. Song entity 604 may or may not include one or more relationships 618. In some embodiments, the song entity may have different and/or additional attributes (e.g., artist, album, etc). In some embodiments, the song entity 604 may itself have one or more fetched properties defined for it. Since a source store is not specified for fetched property 612, the query is performed across all available persistent stores whose configurations support song entity 604. The fetched property between the parent playlist entity and the target song entity is visually illustrated in FIG. 6 by a dashed arrow (as opposed to the solid arrows used to illustrate the formal relationships depicted in FIG. 5) to indicate the informal, conditional, and dynamic nature of a fetched property.

The attributes of the target entity that the query associated with a fetched property must satisfy (i.e. the criteria) may be dynamically defined by a user of an instance of an entity that includes the fetched property. For an instance of the playlist entity 602, for example, if the genre attribute is set to "Funk" and the decade attribute is set to "1970", the query associated with fetched property 612 returns all instances of the song entity 604 whose genre and decade attributes are funk and 1970, respectively. In some embodiments, one or more criteria associated with a fetched property may be received at runtime from a user associated with an instance of the source object associated with the fetched property, e.g., via a user interface provided by and/or in connection with a client context with which the source object is associated. In some embodiments, a configuration setting or file may be used to define a fetched property or an aspect thereof.

In some embodiments, fetched properties are not static for an entity but are derived from an instance of an entity. Thus, for the instance of the playlist entity described in the aforementioned example, the fetched property in some embodiments is static and will always return funk songs from the 1970's that are stored in the available persistent data stores. The criteria of the fetched property associated with a different instance of the playlist entity may be completely different, e.g., if the genre attribute is set to rock and the decade attribute is set to 1980, then all rock songs from the 1980's that are stored in the available persistent data stores are returned. In another example, the fetched property could use the creation time of the playlist as the input to a computation to derive the criteria for the decade, e.g., playlists created on Tuesdays search for music from the 1990s, etc.

In some embodiments, a fetched property is user or developer configurable and, therefore, dynamically defined. That is, a fetched property can be created for any arbitrary set of attributes associated with the destination entity (which may also be defined or selected by a user) and/or modified or deleted, e.g., at runtime.

In some embodiments, the criteria associated with a fetched property may include one or more identifier(s) that correspond to specific instance(s) of the target entity instead of or in addition to other attributes of the target entity. Thus, in the example given in FIG. 6, the criteria of fetched property 612 may include an identifier associated with a specific instance of the song entity 604, i.e. a specific song object, which song object is always fetched from its associated store if the store is available.

Figure 7:
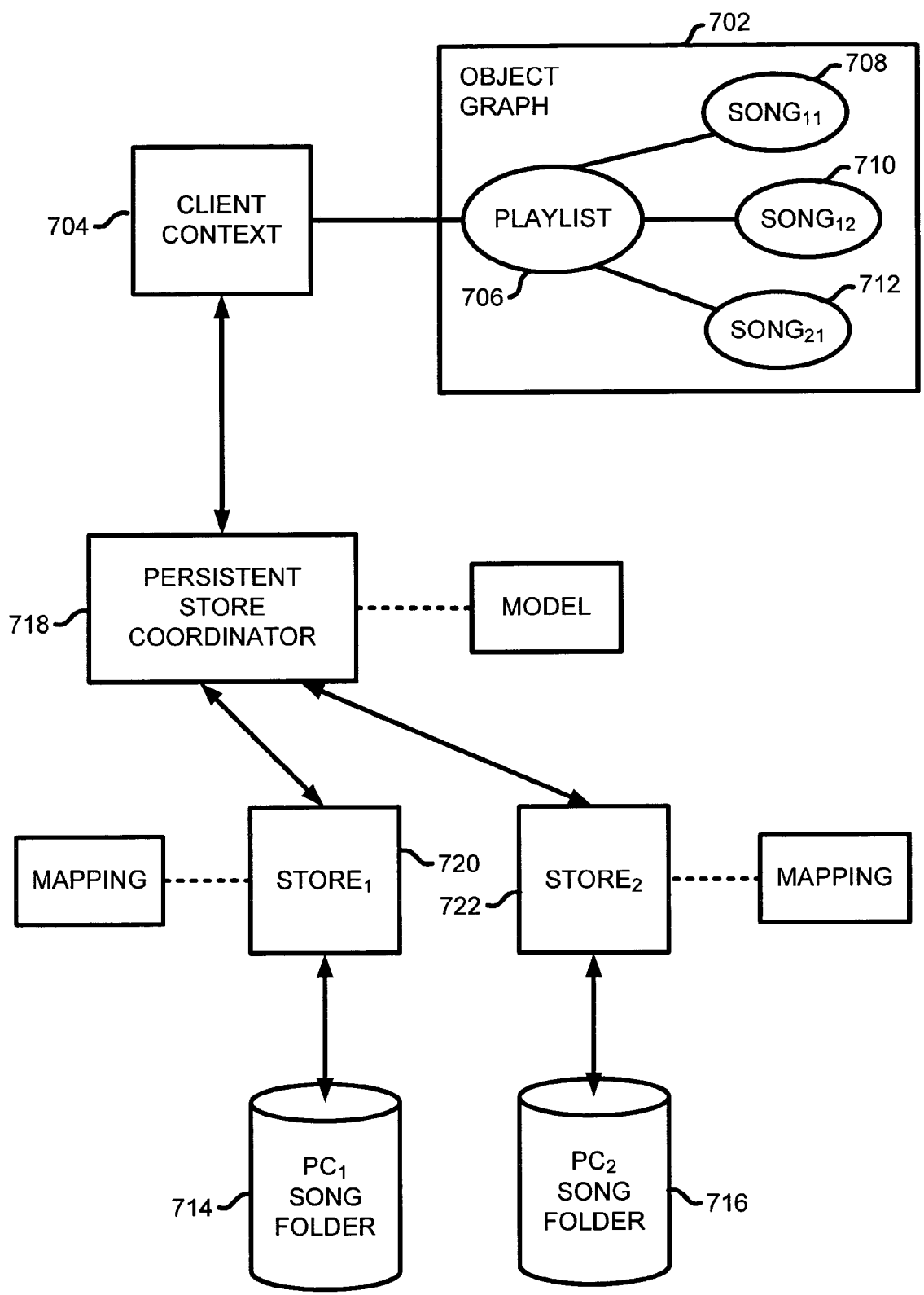
FIG. 7 illustrates an embodiment of an environment in which a fetched property is used.

FIG. 7 illustrates an embodiment of an environment in which a fetched property is used. In the example shown, object graph 702 associated with client context 704 includes a playlist object 706. In some embodiments, playlist object 706 is an instance of a playlist entity (e.g., 602 of FIG. 6). Playlist object 706 is associated with three target song objects: $song_{11}$ 708, $song_{12}$ 710, and $song_{21}$ 712 which are retrieved from available persistent data stores 714 and 716 using a fetched property associated with playlist object 706. In some embodiments, the query associated with the fetched property of playlist object 706 is executed by persistent store coordinator 718 and realized by store objects 720 and/or 722, as applicable. In some embodiments, the criteria of the fetched property includes the respective object identifiers associated with the specific song objects $song_{11}$ 708, $song_{12}$ 710, and $song_{21}$ 712. In the depicted example, song objects $song_{11}$ 708 and $song_{12}$ 710 are retrieved by store, 720 associated with persistent store 714, and song object $song_{21}$ 712 is retrieved by $store_2$ 722 associated with persistent store 716. In the example shown, stores 714 and 716 are folders residing on personal computer workstations (PC's) connected to a computer network; but any persistent or other data store may be used. If a host with which one or the other of stores 714 and/or 716 is associated were disconnected from a network through which the client context 704 and/or PSC 718 had access to the store, the song objects associated with that store would become unavailable; however, playlist object 706 would continue to make available to the client context 704 the song objects, if any, that met the relationship definition (e.g., entity designation and fetch criteria) associated with the fetched property and remained available, e.g., from a remaining data store. In some embodiments, song objects $song_{11}$ 708, $song_{12}$ 710, and $song_{21}$ 712 associated with playlist object 706 appear in object graph 702 regardless of whether the objects are populated, e.g., because the associated data store in which the associated song content data resides is not currently available. Thus, if either (or both) store becomes unavailable, the song object(s) associated with the store remain(s) associated with playlist object 706 and included in object graph 702 but may be shown as, e.g., "not currently accessible" while the other object(s) remain accessible. In alternative embodiments, object graph 702 may only reflect currently available songs associated with playlist object 706. By employing a fetched property to designate particular song objects instead of relationships, playlist object 706 does not "break" if stores associated with the designated objects are unavailable. In some embodiments, if in addition to and/or instead of identifiers associated with particular song objects, the criteria associated with the fetched property of playlist 706 specifically defines attributes of the target song entity (e.g., genre=funk, decade=1970), then all objects that are instances of the song entity that satisfy the defined attributes are fetched for playlist object 706 from all available persistent stores, and the song objects associated with playlist object 706 and its associated object graph 702 are automatically updated as stores are added and deleted. In the example shown, for example, songs 708 and 710 may have been retrieved from data store 714 and song 712 may have been retrieved from data store 716 by operation of PSC 718 and store objects 720 and 722, respectively, because those song objects satisfied criteria associated with a fetched property (e.g., their genre attribute was "funk" and their decade "1970") while other objects in stores 714 and 716, respectively, did not.

Figure 8:
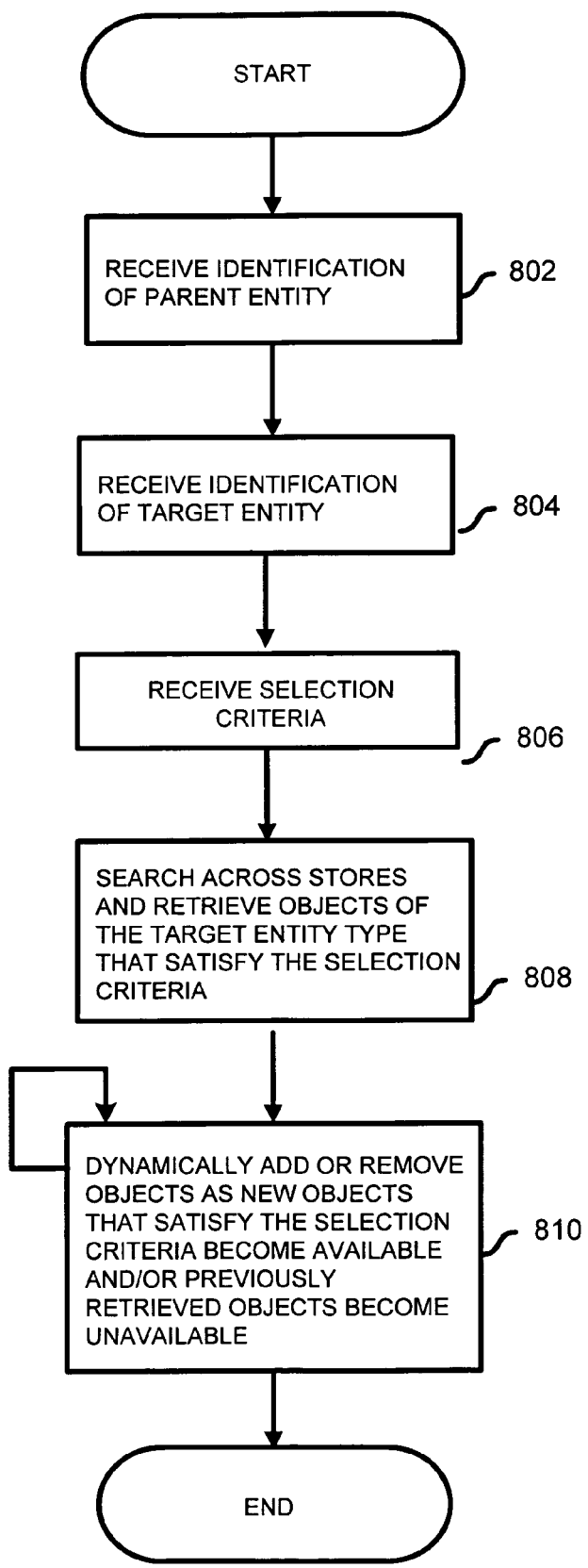
FIG. 8 illustrates an embodiment of a process used to implement a fetched property associated with an entity.

FIG. 8 illustrates an embodiment of a process used to implement a fetched property associated with an entity. In some embodiments, process 800 is executed by a persistent store coordinator (e.g. 718 of FIG. 7). At 802 identification of the parent entity is received. At 804 identification of the target entity is received. At 806 the selection criteria associated with the fetched property is received. In some embodiments the identification of the target entity and selection criteria are received at the same time. In some embodiments, 802, 804 and/or 806 include receiving data provided by a user via a user interface and/or receiving configuration data either before or during runtime, e.g., from a client context or associated process or data source. At 808 all available stores are searched, and objects of the target entity type that satisfy the selection criteria are retrieved. Target objects in the object graph associated with an object for which process 800 is executed are dynamically added or removed at 810 as new objects that satisfy the selection criteria become available and/or previously retrieved objects become unavailable. In some embodiments, target objects remain in the object graph of the parent object even if they are not available and are listed with a notification such as "source currently not available".

Figure 9:
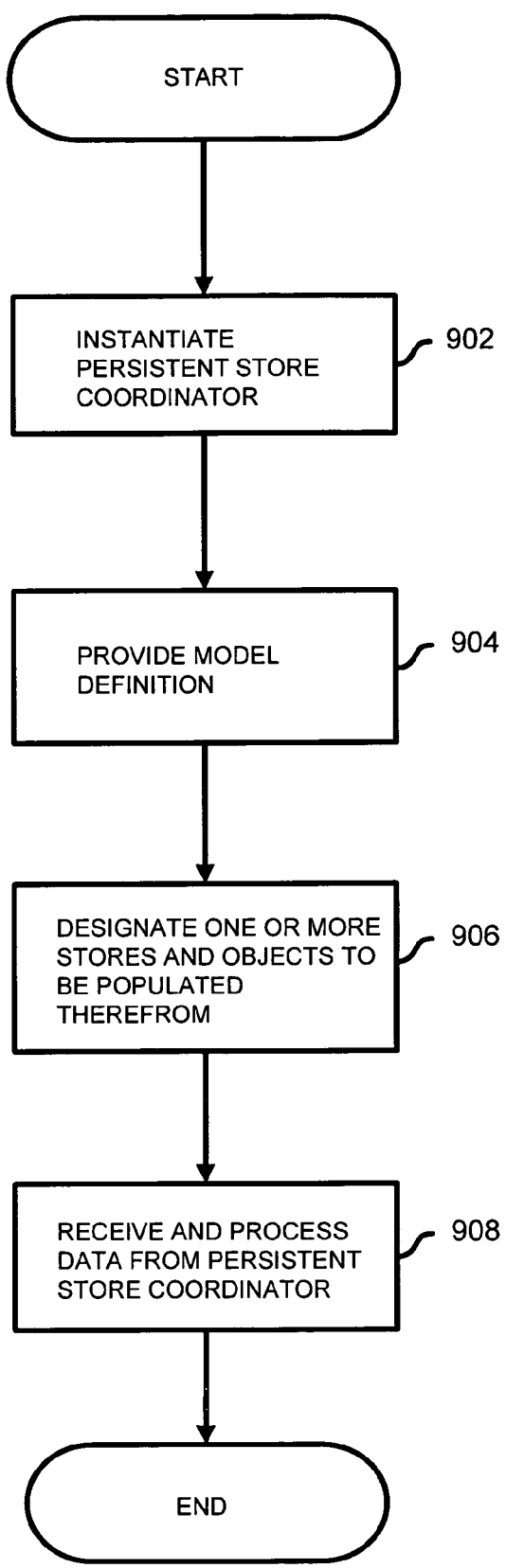
FIG. 9 illustrates an embodiment of a process used when an application is launched and a client context of the application is initialized.

FIG. 9 illustrates an embodiment of a process used when an application is launched and a client context of the application is initialized. In the example shown, at 902 a persistent store coordinator object is instantiated by the client context and/or associated application. In some embodiments, a new persistent store coordinator object is not instantiated at 902, but rather, a pre-existing persistent store coordinator object is selected to serve the initialized client context. At 904, the persistent store coordinator associated with the initialized client context is provided a model definition that formally describes the object graph managed by the client context in memory. In some embodiments, the model definition is dynamically generated when an application is launched or a client context is initialized. Alternatively, the initialized client context may already include a pre-existing model definition (e.g., if a model definition was generated during a previous run of the client context or defined or otherwise configured statically by a developer of the associated client application) or the persistent store coordinate may have received prior to runtime and associate with the client context at client context runtime a model (or model component) associated with the client context. At 906, the client context designates to its associated persistent store coordinator one or more persistent data stores it expects to interact with, e.g., save data to, retrieve or fetch data from, query, etc. In addition, as depicted in FIG. 9, at 906 the client context also designates one or more objects to be populated from the designated stores. In some embodiments, 906 includes an identification of a "configuration" that includes and/or describes the entities associated with the client context that are to be populated using the designated store. In some embodiments, the persistent store coordinator is configured to identify programmatically which persistent data stores are to be associated with the client context, e.g., based at least in part on configuration data associated with the client context. At 908, the data files (i.e. objects), if any, retrieved by the persistent store coordinator from the stores designated (or identified programmatically by the PSC) in 906 are received by the client context from the persistent store coordinator. In some embodiments, the data objects received at 908 include, if applicable, data objects retrieved as a result of their being associated with a fetched property defined for an object in the client context's object graph, e.g., because they are of a target type associated with the fetched property and satisfy the criteria associated with the fetched property.

Figure 10:
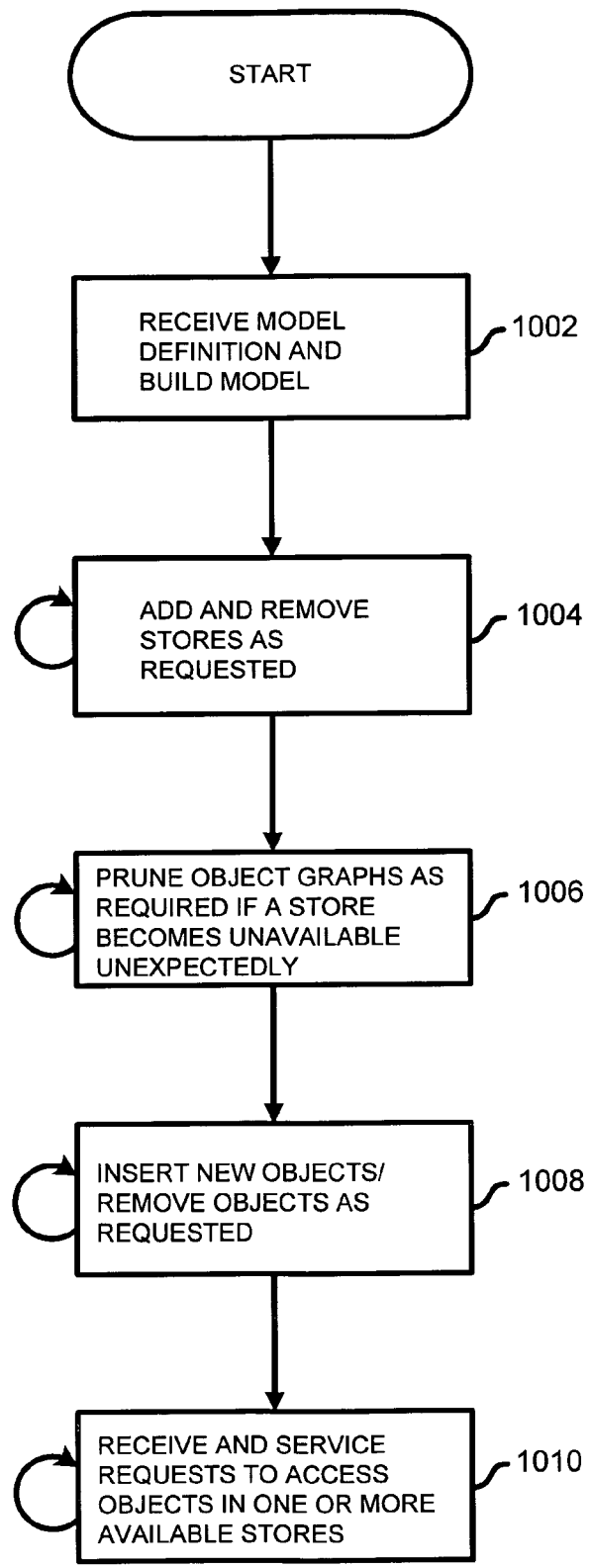
FIG. 10 illustrates an embodiment of processes performed by a persistent store coordinator.

FIG. 10 illustrates an embodiment of processes performed by a persistent store coordinator. At 1002, a persistent store coordinator receives a model definition and builds (or adds to) a model based on the model definition. In some embodiments, the model definition received at 1002 is the model definition provided in 904 of FIG. 9. In some embodiments, the model definition includes one or more models that define the object graphs associated with one or more client contexts associated with the persistent store coordinator. If multiple models exist, the persistent store coordinator utilizes the union of all the models to realize or build a single model that allows the persistent store coordinator to service its associated client contexts. In some embodiments, model 116 of FIG. 1 is the model built by the persistent store coordinator at 1002. In some embodiments, the model includes for one or more entities a fetched property defined for objects associated with the entity.

In some embodiments, once a persistent store coordinator is instantiated and a model realized by the persistent store coordinator, the persistent store coordinator exclusively manages data communication between its associated client contexts and the available persistent data stores. For example, stores are dynamically added to and/or removed from the set of available persistent data stores by the persistent store coordinator as and when requested by one or more client contexts associated with the persistent store coordinator (1004). If a persistent data store becomes unexpectedly unavailable (e.g., if a removable media store is unexpectedly removed, a server in the network goes down, etc.), the object graphs of the affected client contexts are pruned by the persistent store coordinator (1006) so that the object graphs always reflect only the data (i.e. objects) that exist in stores currently available to the persistent store coordinator. For example, if the person and address objects of object graph 300 of FIG. 3 are externally stored in a XML file and the phone number object is externally stored in a SQL database and the SQL database is unexpectedly removed, the phone number object is pruned from the object graph. In some embodiments, 1006 includes informing each affected client context that a store has become unavailable and/or informing each affected client context that specified affected objects should be pruned from the object graph associated with the client context. In some embodiments, the persistent store coordinator informs the client contexts which stores have become unavailable, and the client contexts eliminate references to objects loaded from those stores.

In some embodiments, if a persistent data store that previously became unexpectedly unavailable becomes available again, the persistent store coordinator ensures that the object graphs of the affected clients are updated, i.e. the affected objects are re-inserted into the object graphs. For the example given above, if the SQL database that stores phone numbers becomes available again, the phone number object is re-inserted into the object graph from which it was pruned when the SQL database became unexpectedly unavailable. The persistent store coordinator inserts descriptions of new objects into its model and removes descriptions of objects which are no longer in use from its model as and when it becomes aware of such changes (1008). In some embodiments, 1008 includes receiving requests and/or updates from one or more client contexts about the object(s) with which the client context desires to work. The persistent store coordinator receives and services requests from one or more associated client contexts to access one or more available stores (e.g. to save data to, fetch data from, query, etc.) (1010). In some embodiments, such requests are serially handled by the persistent store coordinator. 1004-1010 may be performed by the persistent store coordinator any number of times and in any order and/or simultaneously.

In some embodiments, the persistent store coordinator represents a single access point to multiple persistent data stores. The persistent store coordinator represents multiple stores as a union to its associated client contexts. That is, all external data files from multiple persistent data stores appear to be associated with a data source to the client contexts. The dynamic removal and/or addition of persistent data stores is supported by the persistent store coordinator and conveyed by the persistent store coordinator to the client contexts by the synchronous update of affected object graphs (i.e. by pruning and/or inserting objects) of the client contexts in memory. The client contexts are completely isolated from the external persistent data stores and do not have to be concerned about the structure in which objects are persistently stored. In addition, the persistent store coordinator may provide client contexts with additional data handling functionalities. For example, the persistent store coordinator may validate data, guarantee integrity, ensure relationships, perform conversions, etc., thus relieving the client contexts of the overhead of performing such operations individually.

In some embodiments, 1004 is performed each time a new store becomes available. In some embodiments, the PSC is informed when a new store becomes available (e.g., a system connects to a network or a volume of removable media is inserted into a drive) and automatically accesses the store if the PSC determines, e.g., by "sniffing" metadata or other data associated with the store, that the store is or may be of interest to one or more client contexts with which the PSC is associated. In some embodiments, the client context becomes aware of a new store becoming available and instructs the PSC to add the store as one to which the client context has access.

When multiple persistent data stores are present, the individual stores are identified in some embodiments by an at least locally unique store identifier. In some embodiments, the store identifier is used to define cross-store relationships between objects. In some embodiments, when a store file is created, a unique store identifier is added to the file. The store identifier may be part of metadata associated with and stored in the store file, e.g., in a generic format at the beginning of the store file or in a region external to but associated with the store file. In some embodiments, the store identifier is the URI of the store. In some embodiments, a unique identifier that is not a URI is used, since in some cases the location of a store file and, as a result, its URI, may change. Each object stored in a persistent data store is identified in some embodiments by a unique object identifier, e.g., a primary key, by which the object is known to the data store. In some embodiments, the object identifier associated with an object added to a persistent data store, or some portion thereof and/or data associated therewith, may be added to metadata associated with the persistent data store. In some embodiments, the object identifier (and/or store identifier) is itself an opaque object that defines a unique identifier. In some embodiments, the object identifier includes the store identifier. That is, an object identifier may be a composite of the store identifier which corresponds to the store in which the object is stored and the object identifier (e.g., primary key) by which the object is known or identified by its associated store. Thus, from such object identifiers, it is possible to deduce the store an object comes from and the data (i.e. the row, table, etc.) in the store that object represents.

Figure 11:
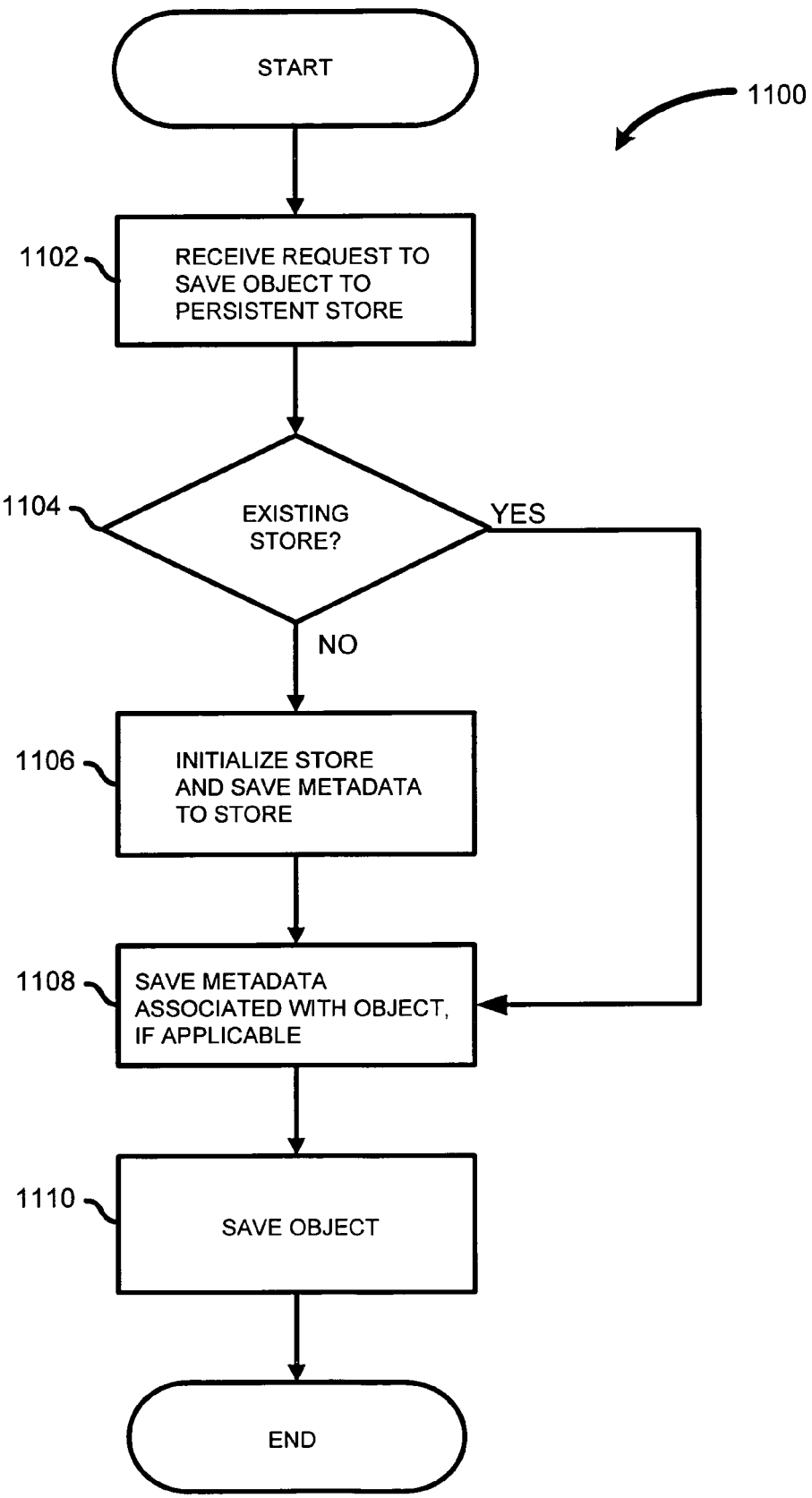
FIG. 11 illustrates an embodiment of a process used to store, in connection with a request to save a data object to a persistent data store, metadata associated with the object and/or the store in which the object is stored.

FIG. 11 illustrates an embodiment of a process used to store, in connection with a request to save a data object to a persistent data store, metadata associated with the object and/or the store in which the object is stored. In some embodiments, process 1100 is used to add an object identifier into the metadata associated with an object and/or a store identifier into the metadata associated with a store. At 1102 a request is received to save an object to a persistent data store. In some embodiments, such a request may be received by a persistent store coordinator from an associated client context. It is determined at 1104 whether the object request to be saved at 1102 is to be saved to an existing store. If it is determined at 1104 that the object requested to be saved at 1102 is to be saved to a new store, at 1106 a new store is initialized and metadata is saved to the new store. In some embodiments, a store identifier is written to the metadata associated with the new store at 1106. Other metadata that may be saved to the new store at 1106 includes, but is not limited to, the store type, the configuration supported by the store, version information, etc. In some embodiments, the persistent store coordinator writes the metadata saved to the store at 1106. In some embodiments the metadata is written using a generic format and syntax that is not specific to a particular type of data store. In some embodiments, the metadata is written to a storage location that is external to but associated with the data store. If it is determined at 1104 that the object is to be saved to an existing store or after initializing a new store at 1106, at 1108 metadata associated with the object requested to be saved at 1102 is stored, if applicable. In some embodiments, if the object requested to be saved at 1102 is a newly created object, an object identifier, which in some embodiments may be a composite of a store identifier that identifies the store in which the object is (to be) stored and an object identifier that identifies the specific object in the store, is written to the metadata associated with the object at 1108. Other metadata that may be saved to an object at 1108 includes, but is not limited to, object type, size, date/time of creation, author, etc. In some embodiments, at 1108 the persistent store coordinator writes the metadata associated with the object. At 1110, the object requested to be saved at 1102 is saved to its associated persistent store.

In some embodiments, a URI is generated for each object by performing a computation based on the object identifier and (if not already part of the object identifier) the store identifier associated with the object. The URI contains the same information as the object and store identifiers associated with an object. Such a URI provides a standard form representation of the location of an object that is recognizable to and/or compatible with external processes. That is, the URI representation of an object may be exported or passed out to external processes (e.g., to another application, to a network server, to a file and/or database that a client context separately controls, etc.) that would not be able to identify the location of the object from the object/store identifier pair associated with the object. In some embodiments, the persistent store coordinator provides functionality to resolve a URI representation of an object back into its associated object/store identifiers and retrieve the data object from the store using the object and store identifiers.

Figure 12:
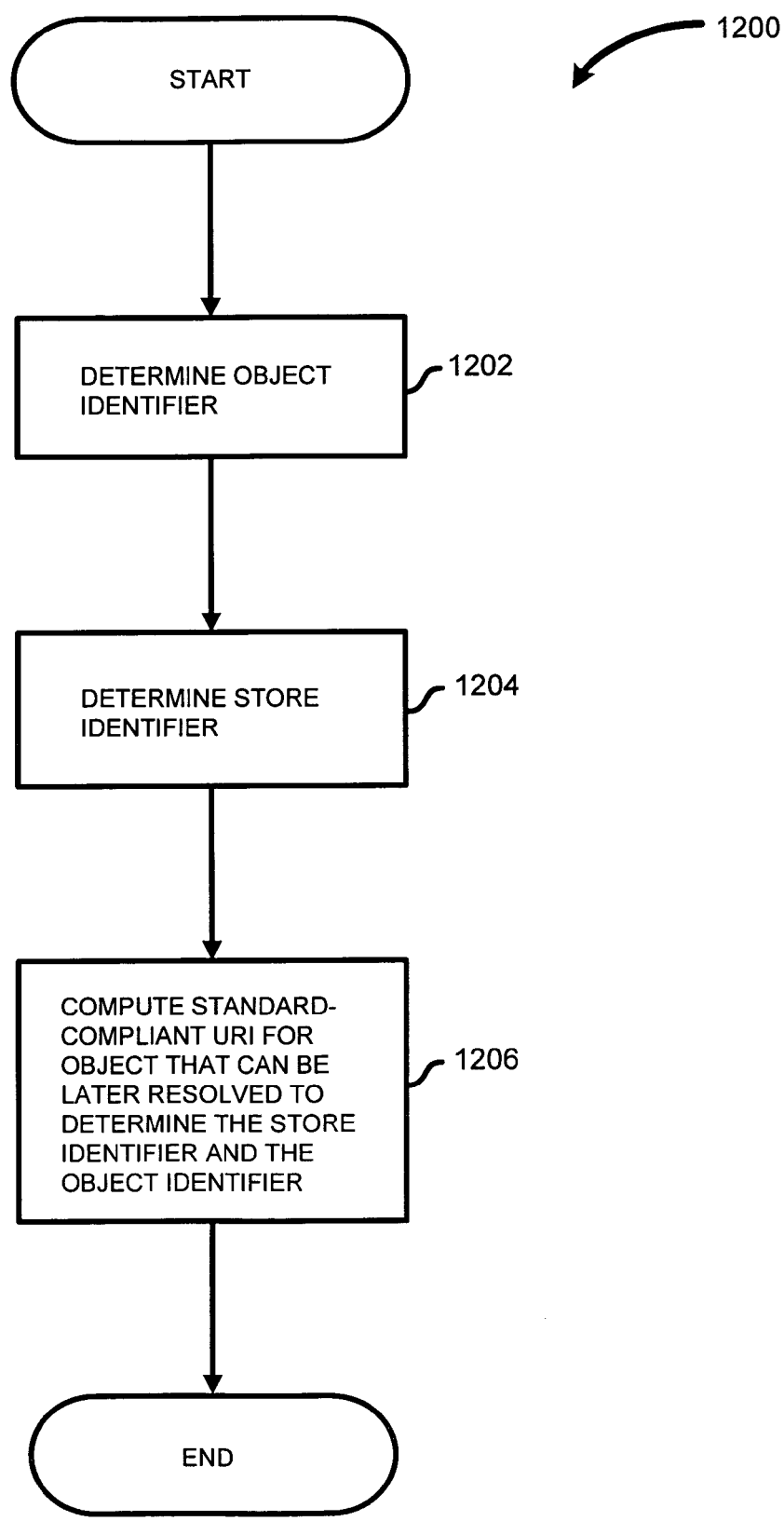
FIG. 12 illustrates an embodiment of a process in which a URI is generated for an object.

FIG. 12 illustrates an embodiment of a process in which a URI is generated for an object. In some embodiments, process 1200 may be performed by a persistent store coordinator. At 1202 the object identifier of the object is determined. At 1204 the store identifier of the store in which the object is stored is determined. In some embodiments, the store identifier is extracted from the object identifier, i.e. if the store identifier is part of the object identifier that also includes the object identifier by which the object is known to the store in which it is stored. At 1206, a standard compliant URI is computed for the object that can later be resolved to determine the store identifier and object identifier associated with the object. In some embodiments, a URI may not be computed at 1206 but some other standard form representation of the location of the object may be computed or generated based on the store identifier and the object identifier associated with the object.

The URI representation or associated store/object identifier pair of an object facilitates the identification of the object in an environment that supports multiple persistent data stores and allows cross-store relationships and fetched properties between objects of different stores (as well as the same store). In some embodiments, a target object that is an instance of a target entity of a relationship is identified by the URI or store/object identifier pair associated with the target object. Likewise, in some embodiments, an instance of a target entity that is specified in the criteria of a fetched property is identified by the URI or store/object identifier pair associated with the target object.

Figure 13:
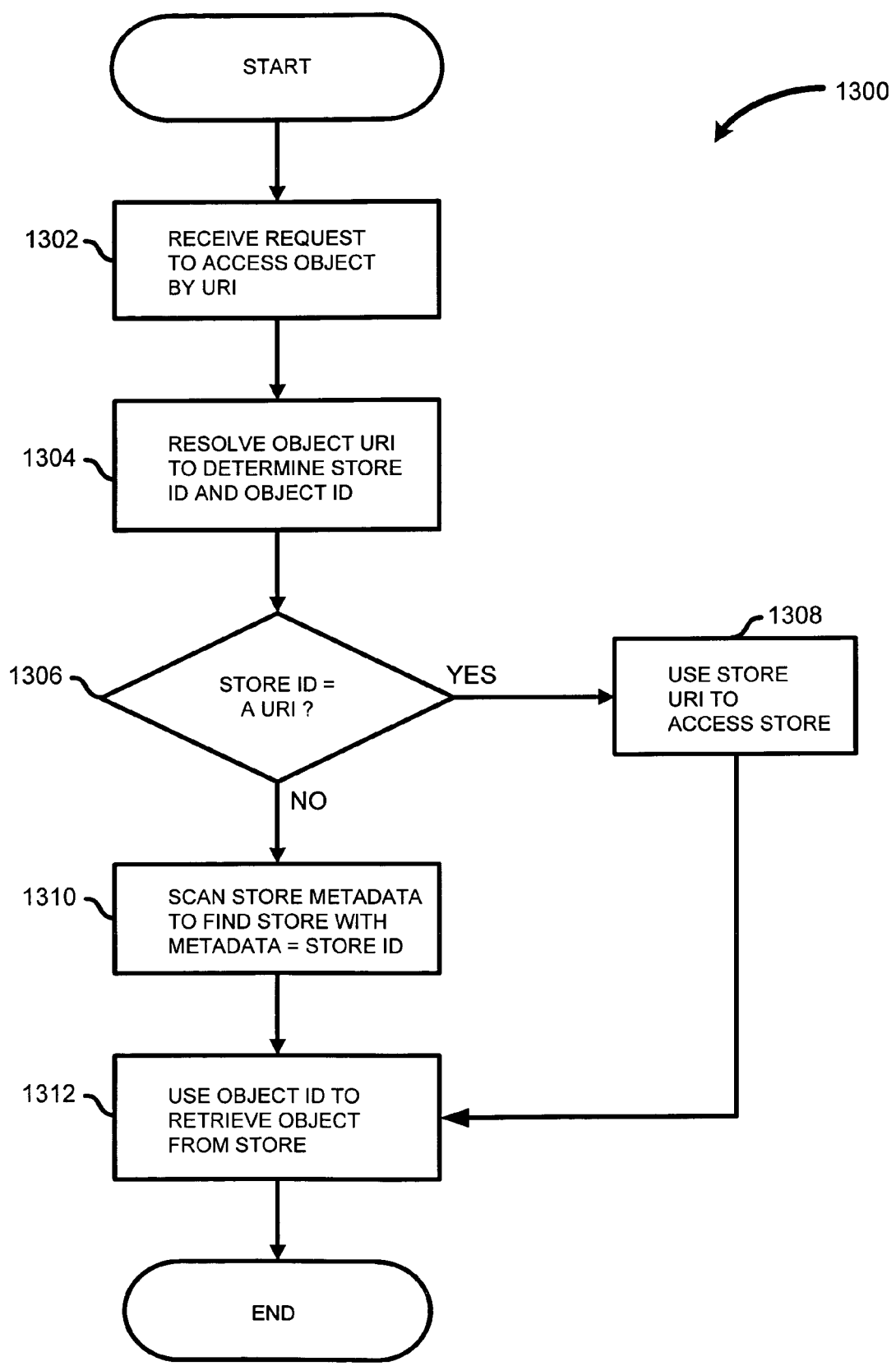
FIG. 13 illustrates an embodiment of a process in which the URI associated with an object is used to retrieve the object from its associated store.

FIG. 13 illustrates an embodiment of a process in which the URI associated with an object is used to retrieve the object from its associated store. In some embodiments, process 1300 is executed by a persistent store coordinator. At 1302 a request to access an object by its associated URI is received. At 1304, the URI of the object received at 1302 is resolved to determine the associated store identifier and object identifier. At 1306 it is determined whether the store identifier is a URI. If it is determined at 1306 that the store identifier is a URI, the store URI is used to access the store at 1308. If it is determined at 1306 that the store identifier is not a URI, at 1310 metadata of the available stores is scanned to find the store that has the store identifier determined at 1304 as part of the metadata associated with that store. Once the correct store is accessed or found via either 1308 or 1310, the object identifier (or a portion thereof, e.g., a primary key) is used to retrieve the object requested at 1302 from its associated store.

The approaches described herein enable one or more client contexts to be provided with access to a potentially dynamically changing set of persistent data stores while still allowing cross store relationships to data objects stored across these potentially dynamically changing set of persistent data stores.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for defining a relationship to an object, comprising:
   receiving from a client a relationship definition that identifies a type of object to which the relationship pertains and specifies a property to be used to determine which, if any, objects of the identified type are to be included in the relationship;
   determining dynamically which, if any, currently available objects of the identified type have the specified property;
   making available to the client at any given time, from among the objects of the identified type available at that time, if any, those objects, if any, that have the specified property; and
   continuing to make available to the client, in the event a removed object previously made available as a result of its having the specified property becomes unavailable, those remaining objects, if any, that have the specified property and remain available.

2. A method as recited in claim 1, wherein the specified property comprises an identifier associated with a particular data object.

3. A method as recited in claim 1, wherein the specified property comprises a uniform resource identifier (URI) associated with a particular data object.

4. A method as recited in claim 1, wherein the specified property comprises a uniform resource indicator (URI) associated with a particular data object and making available to the client those objects, if any, that have the specified property comprises:
   resolving the URI to determine a store identifier and an object identifier;
   using the store identifier to access a persistent data store associated with the store identifier; and
   using the object identifier to retrieve from the persistent data store a data object associated with the object identifier.

5. A method as recited in claim 4, wherein using the store identifier to access the persistent data store includes checking metadata associated with the persistent data store to determine whether the store identifier is associated with the persistent data store.

6. A method as recited in claim 4, wherein the persistent data store is one of a plurality of persistent data stores and using the store identifier to access the persistent data store includes checking with respect to each of one or more of the plurality of persistent data stores to determine whether the store identifier is included in metadata associated with that persistent data store.

7. A method as recited in claim 4, further comprising generating for each of one or more objects of the identified type a URI determined based at least in part on a store identifier associated with a data store in which the object is stored and an object identifier by which the object is identified in the data store.

8. A method as recited in claim 1, wherein the specified property comprises a query.

9. A method as recited in claim 1, wherein the specified property comprises a query expressed using a native query language associated with a persistent data store.

10. A method as recited in claim 1, wherein the specified property comprises a query expressed using a predicate.

11. A method as recited in claim 1, further comprising making available to the client additional objects of the identified type that have the specified property dynamically as such additional objects become available.

12. A method as recited in claim 1, further comprising associating with a parent object that owns the relationship a set of one or more objects of the identified type that have the specified property and wherein making available to the client at any given time, from among the objects of the identified type available at that time, if any those objects, if any, that have the specified property includes making available to the client at any given time those objects from the set that are available at that time.

13. A method as recited in claim 12, wherein associating with a parent object that owns the relationship a set of one or more objects of the identified type that have the specified property comprising including for each object comprising the set a data entry in a list associated with the parent object.

14. A method as recited in claim 13, further comprising including in the list an indication of which data objects in the list are currently available.

15. A method as recited in claim 1, wherein the relationship definition is received at runtime via a user interface associated with the client.

16. A method as recited in claim 1, wherein the relationship definition is statically configured.

17. A method as recited in claim 1, wherein making available to the client at any given time, from among the objects of the identified type available at that time, if any, those objects, if any, that have the specified property includes retrieving said objects from one or more of a plurality of persistent data stores.

18. A system for defining a relationship to an object, comprising:
   a processor configured to:
      receive from a client a relationship definition that identifies a type of object to which the relationship pertains and specifies a property to be used to determine which, if any, objects of the identified type are to be included in the relationship;
      determine dynamically which, if any, currently available objects of the identified type have the specified property;
      make available to the client at any given time, from among the objects of the identified type available at that time, if any, those objects, if any, that have the specified property; and continue to make available to the client, in the event a removed object previously made available as a result of its having the specified property becomes unavailable, those remaining objects, if any, that have the specified property and remain available; and a memory coupled to the processor and configured to provide instructions to the processor.

19. A system as recited in claim 18, wherein the specified property comprises an identifier associated with a particular data object.

20. A system as recited in claim 18, wherein the specified property comprises a query.

21. A system as recited in claim 18, wherein the processor is further configured to make available to the client additional objects of the identified type that have the specified property dynamically as such additional objects become available.

22. A system as recited in claim 18, wherein the processor is further configured to associate with a parent object that owns the relationship a set of one or more objects of the identified type that have the specified property and to make available to the client at any given time those objects from the set that are available at that time.

23. A system as recited in claim 18, wherein the processor is further configured to retrieve from one or more of a plurality of persistent data stores said objects of the identified type available at that time, if any, that have the specified property.

24. A computer program product for defining a relationship to an object, the computer program product being embodied in a computer readable medium and comprising computer instructions for:

receiving from a client a relationship definition that identifies a type of object to which the relationship pertains and specifies a property to be used to determine which, if any, objects of the identified type are to be included in the relationship;

determining dynamically which, if any, currently available objects of the identified type have the specified property;

making available to the client at any given time, from among the objects of the identified type available at that time, if any, those objects, if any, that have the specified property; and continuing to make available to the client, in the event a removed object previously made available as a result of its having the specified property becomes unavailable, those remaining objects, if any, that have the specified property and remain available.

25. A computer program product as recited in claim 24, wherein the specified property comprises an identifier associated with a particular data object.

26. A computer program product as recited in claim 24, wherein the specified property comprises a query.

27. A computer program product as recited in claim 24, further comprising computer instructions for making available to the client additional objects of the identified type that have the specified property dynamically as such additional objects become available.

28. A computer program product as recited in claim 24, further comprising computer instructions for associating with a parent object that owns the relationship a set of one or more objects of the identified type that have the specified property and wherein making available to the client at any given time, from among the objects of the identified type available at that time, if any those objects, if any, that have the specified property includes making available to the client at any given time those objects from the set that are available at that time.

29. A computer program product as recited in claim 24, wherein making available to the client at any given time, from among the objects of the identified type available at that time, if any, those objects, if any, that have the specified property includes retrieving said objects from one or more of a plurality of persistent data stores.

* * * * *